United States Patent [19]

Furukawa et al.

[11] 3,989,678

[45] Nov. 2, 1976

[54] HOT MELT ADHESIVES COMPRISING COPOLYMERIC POLYAMIDES

[75] Inventors: Kaoru Furukawa; Shinichiro Seki; Takashi Akiyama; Singo Ueda; Hideo Ikeda, all of Otsu, Japan

[73] Assignee: Toyo Boseki Kabushiki Kaisha, Osaka, Japan

[22] Filed: Sept. 13, 1973

[21] Appl. No.: 396,809

[30] Foreign Application Priority Data

Sept. 13, 1972 Japan.............................. 47-92084

[52] U.S. Cl.............................. 260/78 L; 156/331; 260/78 A; 260/857 R; 264/176 F; 264/177 R; 427/412
[51] Int. Cl.².......................................... C08G 69/36
[58] Field of Search.............. 260/78 L, 78 A, 857 R

[56] References Cited
UNITED STATES PATENTS

| | | | |
|---|---|---|---|
| 2,252,555 | 8/1941 | Carothers.......................... | 260/78 L |
| 3,322,731 | 5/1967 | Cook et al......................... | 260/78 L |
| 3,703,595 | 11/1972 | Falkenstein et al................ | 260/78 L |
| 3,734,887 | 5/1973 | Schmitt et al................. | 260/78 A X |
| 3,784,495 | 1/1974 | Sprauer........................ | 260/78 L X |
| 3,839,121 | 10/1974 | Schmitt.......................... | 260/78 A X |
| 3,850,887 | 11/1974 | Halas et al......................... | 260/78 L |

*Primary Examiner*—Lucille M. Phynes
*Attorney, Agent, or Firm*—Stewart and Kolasch, Ltd.

[57] ABSTRACT

Figure 1:
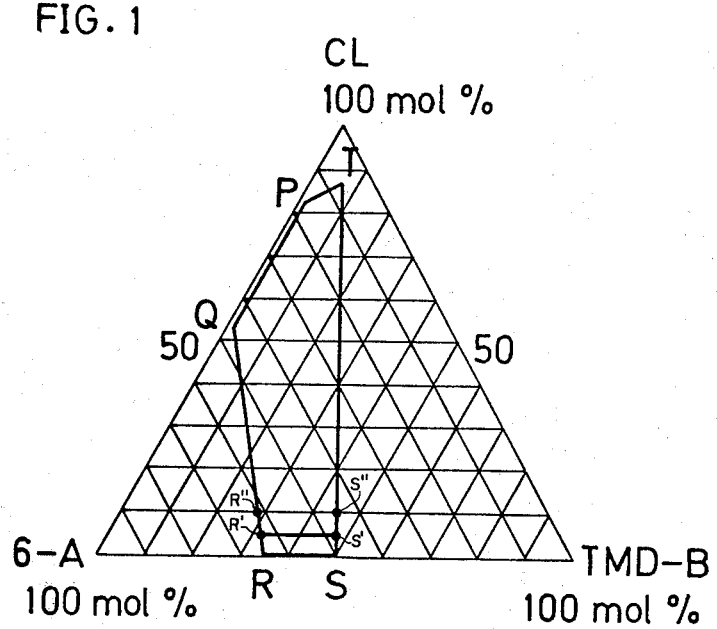

A hot melt adhesive which comprises a copolyamide consisting essentialy of (1) ε-caprolactam, (2)(a) hexamethylenediamine and (b) at least one straight chain, saturated aliphatic dicarboxylic acid having 6 to 20 carbon atoms in a substantially equimolar ratio and (3)(a) at least one of 2,2,4-trimethylhexamethylenediamine and 2,4,4-trimethylhexamethylenediamine and (b) at least one straight chain, saturated aliphatic dicarboxylic acid having 6 to 20 carbon atoms in a substantially equimolar ratio, the proportion of [A] the constituent unit essentially consisting of the component (1), [B] the contituent unit essentially consisting of the components (2)(a) and (2)(b) and [C] the constituent unit essentially consisting of the components (3)(a) and (3)(b) therein being within a pentagon circumscribed by the lines connecting the points P (82/17/1), Q (52/47/1), R (0/65/35), S (0/50/50) and T (86/7/7) in the graph as shown in FIG. 1 of the accompanying drawing (the numerals in the parenthesis following P, Q, R, S and T indicating the molar percentages of the constituent units [A], [B] and [C], respectively).

4 Claims, 2 Drawing Figures

HOT MELT ADHESIVES COMPRISING COPOLYMERIC POLYAMIDES

The present invention relates to a polyamide hot melt adhesive having a high durability to repeated laundering and/or dry cleaning.

In the apparel industry, the sewing process requires more labor and skills than any other process. Therefore, improvements in the sewing process have long been demanded. Although a variety of new sewing processes have been studied heretofore, the adhesive sewing process has been of particular note recently because of the resulting fine finish, improved fit, adaptability to knits and other features, in addition to the saving of labor. There are many kinds of adhesive sewing processes, for example, a process in which threads having an adhesive property are woven into a part of the fabrics to be bonded and the bonding is effected by the application of heat under pressure, a process wherein the heat pressure bonding results when an adhesive in the form of a tape is placed between the fabrics to be bonded, and a process involving the use of an adhesive in the form of a nonwoven sheet or a sheet as a fusible interlining. Adhesives in the form of a thread, tape, nonwoven sheet or sheet must have an adequate combination of washability with dry-cleanability.

For this purpoe, adhesives containing polyvinyl compounds such as vinyl acetate copolymer and ethylene/-methyl methacrylate copolymer, poluurethanes, copolyesters and copolyamides have already been developed commercially. Although polyvinyl compounds, polyurethanes and copolyesters are favorable adhesives with low melting points as well as washability, they have a great disadvantage of low dry-cleanability, i.e. they cannot be dry-cleaned without a substantial loss of adhesiveness. Some crystalline polymers such as copolymeric polyamides, e.g. nylon 6-66, 6-610, 6-66-610 and the like, do not possess good washability while they have considerable high dry-cleanability, and it is difficult to obtain such polymers with low melting points. Thus, it has been proposed to add various plasticizers to such high melting point polyamides in order to make the polyamide products workable at low temperatures. This procedure, however, is not favorable because the plasticizer added to the polyamide tends to diffuse out therefrom to the surface of the heat-adhered cloth causing discoloration, or the plasticizer is almost extracted upon dry-cleaning, resulting in the loss of the adhesive action.

Furthermore, the terpolyamide of dodecanolactam disclosed in Japanese patent publication No. 36,916/1970 has a low melting point, but it is insufficient in its durability to dry-cleaning because of its considerably low crystallinity. Amorphous, transparent resins of polyamides wherein at least half of the diamine component is a branched-chain diamine provide adhesives having excellent low temperature workability, but they lack satisfactory physical strength and resistance to chemicals because of their amorphous structure.

It is therefore a basic object of the present invention to provide hot melt adhesives which have low melting points and the combined properties of good washability and dry-cleanability. Another object of this invention is to provide hot melt adhesives composed of copolymeric polyamides. Other objects, features and advantages of the invention will become apparent during the course of the following description, the claims, and the accompanying drawing.

The hot melt adhesive of the present invention comprises a copolyamide consisting essentially of (1) ε-caprolactam, (2) (a) hexamethylenediamine and (b) at least one straight chain, saturated aliphatic dicarboxylic acid having 6 to 20 carbon atoms in a substantially equimolar ratio and (3) (a) at least one of 2,2,4-trimethylhexamethylenediamine and 2,4,4-trimethylhexamethylenediamine and (b) at least one straight chain, saturated aliphatic dicarboxylic acid having 6 to 20 carbon atoms in a substantially equimolar ratio, the proportion of [A] the constituent unit essentially consisting of the component (1) (hereinafter referred to as "CL"), [B] the constituent unit essentially consisting of the components (2)(a) and (2)(b) (hereinafter referred to as "6-A") and [C] the constituent unit essentially consisting of the components (3)(a) and (3)(b) (hereinafter referred to as "TMD-B") therein being within a pentagon circumscribed by the lines connecting the points P, Q, R, S and T in the graph as shown in FIG. 1 of the accompanying drawing, for which the illustration will be hereinafter given.

The constituent unit CL is a unit represented by the following formula:

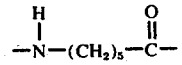

The constituent unit 6-A is a unit represented by the following formula:

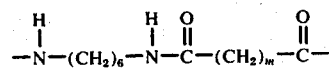

wherein $m$ is an integer of 4 to 18.

The constituent unit TMD-B is a unit represented by the following formula:

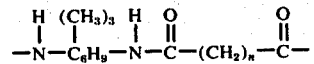

wherein $n$ is an integer of 4 to 18.

In the above significances, $m$ and $n$ are not 4 or 5 at the same time.

The copolyamide to be used in the present invention may be prepared by copolymerizing ε-caprolactam with diamines and dicarboxylic acids. Nylon salts formed from diamines and dicarboxylic acids may be used in the copolymerization with ε-caprolactam instead of the separate use of diamines and dicarboxylic acids. Mixtures of polymers or copolymers of ε-caprolactam, diamines and dicarboxylic acids in a molten state may also be copolymerized by transamidation.

As the ε-caprolactam, there may be used not only ε-caprolactam itself but also any product obtained by the reaction of ε-caprolactam such as its oligomer (or lower molecular weight polymer) or ω-aminocaproic acid.

Examples of the straight chain, saturated aliphatic dicarboxylic acids having 6 to 20 carbon atoms may include adipic acid, pimellic acid, suberic acid, azelaic acid, sebacic acid, undecanedioic acid, dodecanedioic acid, tridecanedioic acid, tetradecanedioic acid, hexadecanedioic acid, heptadecanedioic acid, nonadecanedioic acid, etc. In particular, azelaic acid, sebacic acid and dodecanedioic acid are preferred. Said dicarboxylic acids are used in a substantially equimolar ratio to hexamethylenediamine or to 2,2,4-trimethylhexamethylenediamine and/or 2,4,4-trimethylhexamethylenediamine.

Figure 2:
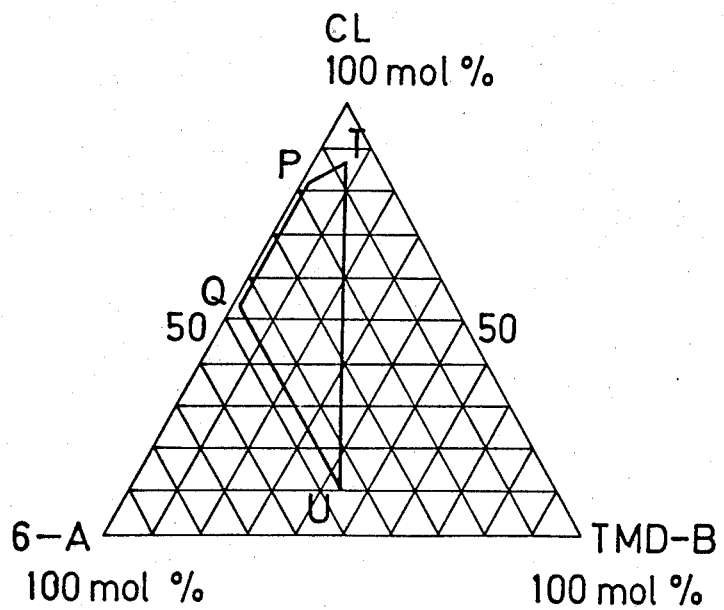

The accompanying drawing illustrates the defined molar ratio and shows trigonometric coordinates expressed in terms of the molar percentage of the total polyamide constituent components, i.e. CL, 6-A and TMD-B. The copolymeric polyamide of the present invention has a molar ratio within the range of a pentagon, having five sides drawn by a line following the order of the five points, i.e. P, Q, R, S and T, indicated by the constituent units CL, 6-A and TMD-B in FIG. 1 of the accompanying drawing. The points, P, Q, R, S and T have the following molar ratio of CL/6-A/TMD-B, respectively: 82/17/1, 52/47/1, 0/65/35, 0/50/50 and 86/7/7. Preferably, the copolyamide of the invention falls within a tetragon, having four sides drawn by a line following the order of the four points, i.e. P, Q, U and T, in FIG. 2. The points, P, Q and T have the same molar ratio as above, and the point U has a molar ratio of CL/6-A/TMD-B = 10/46/44.

The hot melt adhesive of the invention is used for melt adhesion at a low temperaure and possesses satisfactory properties including adhesive strength and resistance to cold and hot water and various solvents. When the molar ratio of TMD-B is greater as compared with that of 6-A, there may be obtained a low melting point polyamide having a high transparency and a completely amorphous structure, but the adhesiveness of such polyamide tends to decrease unsatisfactorily. Generally, cloths using such an adhesive as having TMD-B in a large amount as compared with 6-A should be dried after washing or dry-cleaning at a temperature below 60° C., preferably between about 50° to 60° C., because of the low melting point. Under these conditions, water or solvents are still left unevaporated thereon, thereby impairing the adhesive and permitting the adhered portions to be stripped off quite easily.

The copolyamide of the invention has a relative viscosity of about 1.6 to 2.4, preferably 1.8 to 2.2, at 25° C. in a solution where one gram of the copolyamide is dissolved in 100 ml. of 96 % sulfuric acid. Copolyamides with a relative viscosity of less than about 1.6 are insufficient with respect to their adhesiveness, i.e. tear strength, washability and drycleanability, and those with a relative viscosity of over about 2.4 lack a melt fluidity upon thermal adhesion, thereby rendering them incapable of displaying a satisfactory adhesive property.

The copolyamide hot melt adhesive of the invention may contain the said colorless, transparent, low melting point copolyamide as well as any other additive known to the art. When desired, for example, lubricants, preservatives, antioxidants, antistatic agents, pigments, fungicides, antiseptics and the like may be added thereto.

The hot melt adhesive of the inventon is used in various forms such as threads, powders, films, sheets, nonwoven webs, fabrics and the like. For example, chips of said copolyamides are frozen and crushed into a fine powder of less than 30 mesh, put uniformly or irregularly on the surfce of a cloth or nonwoven sheet made of materials such as cotton, wool, hemp, rayon or synthetic fibers, and then heated for a short period of time at a temperature above the melting point of the said copolyamide to bond the powder to the basic materials. They may be in turn used to bond the cloth or the like to be adhered. The said powder also may be placed between the cloths or sheets to be bonded and then bonded by the application of heat.

As other examples, said copolyamide chips are molten at 160° to 280° C., spun through spinneret nozzles into filaments, supplied to a pneumatic jet and collected on a conveyor in a random manner to form nonwoven webs whose structures are composed of randomly distributed continuous filaments. The molten copolyamide also may be extruded through a T die into films and then heat-set with or without being oriented and taken up on a roll. These webs or films may be slit into tapes having an appropriate width and placed on the portion of cloth to be bonded. The nonwoven webs may have a basis weight of 10 to 60 grams, preferably 15 to 30 grams, per square meter. The films may be 15 to 80 microns, preferably 20 to 50 microns thick. When powders of the copolyamide are scattered as dots on a fabric to be bonded, the amount of the powders may be 10 to 50 grams, preferably 10 to 30 grams, per square meter. Bonding may be applied uniformly over the entire area of the fabric or in closely controlled patterned areas or in random patterned areas.

The copolyamide hot melt adhesive of the inventon can be bonded at a temperature of 120° to 160° C. and a pressure of 0.05 to 0.3 kg./cm.$^2$ for a hot press period of 5 to 10 seconds, whereas conventional adhesives are bonded at a temperature of 160° to 180° C. and a pressure of 0.3 to 2 kg./cm.$^2$ and for a period of time of 10 to 20 seconds. It is thus to be understood that, compared with the use of conventional adhesives, the bonding using the hot melt adhesive of the inventon can be carried out with much ease and, in other words, simple ironing at home achieves bonding with a satisfactory tear strength. The bonding with the hot melt adhesive of the invention is sufficiently resistant to water and can be readily dry-cleaned without deterioration. It also retains a strong tear strength under drying conditions at relatively low temperatures. Accordingly, the hot melt adhesive of the invention is extremely useful for fabric bonding and fusible interlining.

The properties of the hot melt adhesive of the present invention are measured by the following methods:

1. Preparation of Test Samples and Measurement of Tear Strength:

Two kinds of adhesive sheets are prepared for the measurements described below. One of the sheets is manufactured in the following way: A 10 cm. × 5 cm. adhesive sheet to be tested is placed on one half of a 10 cm. × 10 cm. No. 40 broadcloth and another piece of a 10 cm. × 10 cm. No. 40 broadcloth is placed thereon to form a sandwich-like structure. The sandwiched sheets are then pressed at a given temperature and a given pressure and for a given period of time.

The other kind of sheet is prepared by scattering uniformly the adhesive powder onto a half portion of a 10 cm. × 10 cm. No. 40 broadcloth in a given amount and melting it in an oven for a short period of time at a temperature above the melting point of the adhesive. Another cotton cloth having the same size is then placed on the adhesive and is pressed at a given temperature and a given pressure for a given period of time.

A test sample is obtained by cutting the bonded sheets into 4 pieces of a length of 10 cm. and a width of 2.5 cm. in such a way that one half (5 cm. × 2.5 cm.) of the piece has an area where the adhesive is bonded and the other half contains no adhesive.

The test sample thus obtained is then torn off in a T-shaped manner by means of a Tensilon tension tester at a cross-head velocity of 100 mm./minute, a chart velocity of 200 mm./minute, and a tear length of 2.0 cm.

The tear strength is calculated by taking ten readings from the maximum point and another ten readings from the minimum point on a chart graph and is expressed in kilograms per 2.5 centimeters as an average of the ten test samples.

2. Washability:

In an automatic, reversible washing machine, there are charged 35 liters of 75° C. water and 35 grams of a commercial neutral detergent (trade name "New Wonderful", manufactured by Kao Sekken Kabushiki Kaisha, Japan), and about 700 grams of a laundry comprising the said 10 cm. × 10 cm. No. 40 cotton cloth and 12 sheets of said 10 × 10 cm. adhesive test samples packed in a 20 × 30 cm. gauze cloth bag are added thereto. Washing is carried out for 30 minutes at 75° C., and the washed test cloth sheet is then rinsed with water and air-dried. Each of the cloth sheets is then cut into 4 pieces having the same size as described above.

The test sample piece is measured as to its tear strength according to said method. The "washability" is expressed as the tear strength.

As another test to determine the tear strength of the test samples, the washing is repeated five times using the same procedure as described above. After each time the washed test sample is rinsed with water, air-dried, and then ironed.

3. Dry-Cleanability:

In a standard glass bottle, there are charged 300 ml. of perchloroethylene having a temperature of about 50° C. and 20 stainless steel balls. After the temperature is adjusted to 50° ± 3° C., three sheets of said adhesive cloth samples are put therein and washed for 30 minutes by means of a test washing machine according to JIS-L-0821. The washed samples are air-dried and subjected to tearing tests by the method described above. The "dry-cleanability" is expressed as the percentage of the strength retention against the original strength before dry-cleaning.

Practical and presently preferred embodiments of the invention are illustratively shown in the following Examples.

EXAMPLE 1

Into an autoclave were charged 565.8 grams (5.00 moles) of ε-caprolactam, 601.1 grams (2.61 moles) of dodecanedioic acid, 232.4 grams (2.00 moles) of hexamethylenediamine, 79.1 grams (0.50 mol) of a mixed diamine of 2,2,4-trimethylhexamethylenediamine and 2,4,4-trimethylhexamethylenediamine and 800 grams of water. After being flushed with nitrogen, the autoclave was closed and operated so as to reach a temperature of 180° C. and an inner pressure of 10 kg./cm.$^2$ over a period of 40 minutes. After the same pressure was maintained for one hour, about 800 grams of water was removed out of the reaction system, and then the pressure was reduced to atmospheric pressure over a period of one hour. While the pressure decreased, the temperature of the reaction product in the autoclave raised to 260° C. At atmospheric pressure and the same temperature, the reaction was continued for an additional 2 hours, and the reacton mixture was discharged and formed into chips by a conventional method. The chips were allowed to stand for 2 days with moisture and then dried under reduced pressure for an additional 2 days at 60° C. to give polyamide chips having a CL/6-A/TMD-B molar ratio of 67/27/6, a relative viscosity of 1.85 and a melting point of 128° to 130° C.

Said chips were heated to 170° C. and melt-spun into multi-filaments of about 30 deniers, shich were supplied to pneumatic jet and collected on a conveyor in a random manner to form nonwoven webs. The resulting adhesive web had a basis weight of 22 grams per square meter, and its structure was composed of randomly distributed continuous filaments. This web was pressed with an iron at 140° C. and 0.1 kg./cm.$^2$ for 10 seconds according to the above-mentioned measurement method. The test sample thus obtained had a tear strength of 2.96 kg./2.5 cm. The tear strength after washing five times was 1.92 kg./2.5 cm. Its dry-cleanability was 92 %. Although the difference between the temperature applied to the bonding and the melting point of the polyamide resin was about 10° C., a favorable melt adhesion was attained.

EXAMPLE 2

In the same manner as in Example 1, ε-caprolactam, sebacic acid, hexamethylenediamine and a mixed diamine of 2,2,4-trimethylhexamethylenediamine and 2,4,4-trimethylhexamethylenediamine were copolymerized to give copolyamide chips having a CL/6-A/TMD-B molar ratio of 67/27/6, a relative viscosity of 1.85 and a melting point of 128° to 130° C. The chips were then extruded at 170° C. through a T die into an adhesive film having a thickness of about 30 microns. The film was tested in the same manner as in Example 1 to give a tear strength of 2.41 kg./2.5 cm., a tear strength after washing five times of 1.96 kg./2.5 cm. and a dry-cleanability of 93 %. This test sample showed neither stain nor coloration due to the ooze of the adhesive to the surface and had a favorable hand.

EXAMPLE 3

In the same manner as in Example 1, ε-caprolactam, dodecanedioic acid, hexamethylenediamine and a mixed diamine of 2,2,4-trimethylhexamethylenediamine and 2,4,4-trimethylhexamethylenediamine were copolymerized to give polyamide chips having a CL/6-A/TMD-B molar ratio of 52/33/15, a relative viscosity of 1.93 and a melting point of 135° to 137° C. The chips were pulverized into a powder of less than about 60 mesh, which was then uniformly scattered on a No. 40 broadcloth in a basis weight of 30 grams per square meter and pressed with an iron at 160° C. and 0.3 kg./cm.$^2$ for 10 seconds. The test sample thus obtained had a tear strength of 2.56 kg./2.5 cm., a tear strength after washing five times of 2.17 kg./2.5 cm. and a dry-cleanability of 97 %.

COMPARATIVE EXAMPLE 1

In the same manner as in Example 1, ε-caprolactam, dodecanedioic acid, hexamethylenediamine and a mixed diamine of 2,2,4-trimethylhexamethylenediamine and 2,4,4-trimethylhexamethylenediamine were copolymerized to give polyamide chips having a CL/6-A/TMD-B molar ratio of 33/17/50, a relative viscosity of 2.12 and a melting point of 100° to 110° C. Th process of Example 2 was repeated using the same procedure and material except that the adhesive material was formed into a film 45 microns thick and was ironed at 160° C. This test sample had a tear strength of 1.23 kg./2.5 cm., a tear strength after washing five times of 0.97 kg./2.5 cm. and a dry-cleanability of 53 %.

EXAMPLE 4

To a mixture of 900 parts of ion-exchanged water and 691 parts of dodecanedioic acid was added 349 parts of hexamethylenediamine with stirring, and the mixture was heated to give a clear solution. The pH value was adjusted in a conventional way to give an aqueous nylon salt solution (I) having a pH indicating the equivalent point.

Another aqueous nylon salt solution (II) was prepared by adding 237 parts of a mixed diamine of 2,2,4-trimethylhexamethylenediamine and 2,4,4-trimethylhexamethylenediamine to a mixture of 300 parts of ion-exchanged water and 303 parts of sebacic acid with stirring and treating the mixture in the same manner as above. To this solution was added 23.2 parts of sebacic acid as a viscosity stabilizer.

The aqueous solutions (I) and (II) and 113 parts of ε-caprolactam in a molten state were charged in an autoclave. After flushing with nitrogen, the autoclave was closed and heated with stirring so as to reach a temperature of 180° C. and a pressure of 10 kg./cm.$^2$ over a period of 30 minutes. While maintaining the same pressure for one hour, about 1,200 parts of water was removed from the mixture. Then, the pressure was reduced to atmospheric pressure and the temperature was elevated to 260° C. over a period of one hour. After being retained at 260° C. for another hour, the reaction product was discharged from the autoclave under a nitrogen pressure. The product was formed into chips in a conventional way. The chips had a CL/6-A/TMD-B molar ratio of 18/55/27, a relative viscosity of 1.86 and a melting point of 138° to 140° C.

The chips were heated at 170° C. and melt-spun into a multi-filament of about 30 deniers, which were then formed into a nonwoven web having a basis weight of about 40 grams per square meter and being adhesive on both sides. After being treated by steam for 5 seconds, the web was pressed at 150° C. and 0.3 kg./cm.$^2$ for 10 seconds by the same method as described above. The test sample thus obtained had a tear strength of 2.39 kg./2.5 cm., a tear strength after washing five times of 2.10 kg./2.5 cm. and a dry-cleanability of 90 %.

COMPARATIVE EXAMPLE 2

In the same manner as in Example 4, a nylon salt of hexamethylenediamine with azelaic acid and a nylon salt of a mixed diamine of 2,2,4-trimethylhexamethylenediamine and 2,4,4-trimethylhexamethylenediamine with dodecanedioic acid were copolymerized to give polyamide chips having a 6-A/TMD-B molar ratio of 30/70, a relative viscosity of 1.93 and a melting point of 92° to 100° C. An adhesive was prepared in the same manner as in Example 3 using the chips pulverized into a powder, and it was tested with respect to its tear strength. The test sample had a tear strength of 1.29 kg./2.5 cm. and a tear strength after washing five times of 0.89 kg./2.5 cm. It had no drycleanability property.

EXAMPLE 5

In the same manner as in Example 4, ε-caprolactam, a nylon salt of hexamethylenediamine with tetradecanedioic acid and a nylon salt of 2,2,4-trimethylhexamethylenediamine and 2,4,4-trimethylhexamethylenediamine with azelaic acid were copolymerized to give polyamide chips having a CL/6-A/TMD-B molar ratio of 33/50/17, a relative viscosity of 1.92 and a melting point of 137° to 139° C. The chips were molten at 170° C. and extruded through a T die into an adhesive film having a thickness of 50 microns. The test sample with this film had a tear strength of 2.52 kg./2.5 cm., a tear strength after washing five times of 2.27 kg./2.5 cm. and a dry-cleanability of 92 %. Neither oozing of the adhesive nor coloring thereby was observed. The test sample had a good hand.

EXAMPLE 6

In the same manner as in Example 4, a nylon salt of hexamethylenediamine with azelaic acid and a nylon salt of 2,2,4-trimethylhexamethylenediamine and 2,4,4-trimethylhexamethylenediamine with dodecanedioic acid were copolymerized to give polyamide chips having a 6-A/TMD-B molar ratio of 55/45, a relative viscosity of 1.90 and a melting point of 118° to 120° C. The chips were then pulverized into a powder of less than 60 mesh, which was used as a powdery hot melt adhesive.

A No. 40 broadcloth was printed with the adhesive powder at an interval of 11 mesh and in a basis weight of about 27 grams per square meter to form an interlining sheet. Another No. 40 broadcloth was placed thereon and ironed at 150° C. and 0.3 kg./cm.$^2$ for 10 seconds to produce a test sample. The test sample was found to have a tear strength of 2.15 kg./2.5 cm., a tear strength after washing five times of 1.86 kg./2.5 cm. and a dry-cleanability of 82 %.

EXAMPLE 7

In the same manner as in Example 4, ε-caprolactam, a nylon salt of hexamethylenediamine with dodecanedioic acid and a nylon salt of 2,2,4-trimethylhexamethylenediamine and 2,4,4-trimethylhexamethylenediamine with adipic acid were copolymerized to give polyamide chips having a CL/6-A/TMD-B molar ratio of 18/46/36, a relative viscosity of 1.91 and a melting point of 124° to 127° C. The chips were heated at 170° C. and melt-spun into multi-filaments of about 30 deniers, which was then formed into a nonwoven web having a basis weight of about 30 grams per square meter and being adhesive on both sides. After being treated with steam for 5 seconds, the web was pressed at 140° C. and 0.1 kg./cm.$^2$ for 10 seconds in accordance with the same method as described above. The test sample was found to have a tear strength of 2.72 kg./2.5 cm., a tear strength after washing five times of 2.14 kg./2.5 cm. and a dry-cleanability of 83 %.

EXAMPLE 8

In the same manner as in Example 4, ε-caprolactam, a nylon salt of hexamethylenediamine with sebacic acid and a nylon salt of 2,2,4-trimethylhexamethylenediamine and 2,4,4-trimethylhexamethylenediamine with suberic acid were copolymerized to give polyamide chips having a CL/6-A/TMD-B molar ratio of 67/20/13, a relative viscosity of 2.02 and a melting point of 113° to 116° C. The chips were molten at 160° C. and extruded into a film 30 microns thick. This film adhesive was tested in the same manner as in Example 1, and the test sample was found to have a tear strength of 2.65 kg./2.5 cm., a strength after washing five times of 1.93 kg./2.5 cm. and a dry-cleanability of 95 %. The adhesive did not ooze through or color the sample. The sample cloth had good hand.

EXAMPLE 9

In the same manner as in Example 4, ε-caprolactam, a nylon salt of hexamethylenediamine with sebacic acid and a nylon salt of 2,2,4-trimethylhexamethylenediamine and 2,4,4-trimethylhexamethylenediamine with suberic acid were copolymerized to give polyamide chips having a CL/6-A/TMD-B molar ratio of 57/36/7, a relative viscosity of 1.87 and a melting point of 135° to 137° C. The chips were pulverized into a powder of less than 60 mesh and printed on a No. 40 broadcloth in a basis weight of 27 grams per square meter and at an interval of 11 mesh. Another No. 40 broadcloth was placed thereon and ironed at 150° C. and 0.3 kg./cm.$^2$ for 10 seconds to produce a test sample.

The test sample was found to have a tear strength of 2.75 kg./2.5 cm., a tear strength after washing five times of 2.06 kg./2.5 cm., and dry-cleanability of 97 %.

COMPARATIVE EXAMPLE 3

In the same manner as in Example 4, ε-caprolactam, a nylon salt of hexamethylenediamine with azelaic acid and a nylon salt of 2,2,4-trimethylhexamethylenediamine and 2,4,4-trimethylhexamethylenediamine with suberic acid were copolymerized to give polyamide chips having a CL/6-A/TMD-B molar ratio of 33/17/50, a relative viscosity of 1.92 and a melting point of 88° to 98° C. The chips were formed into a film about 3 μ thick, and a test sample was prepared using the film according to the same method as in Example 2.

The test sample was found to have a tear strength of 1.10 kg./2.5 cm., a tear strength after washing five times of 0.73 kg./2.5 cm. and a dry-cleanability of 22 %.

COMPARATIVE EXAMPLE 4

In the same manner as in Example 4, ε-caprolactam, a nylon salt of hexamethylenediamine with azelaic acid and a nylon salt of 2,2,4-trimethylhexamethylenediamine and 2,4,4-trimethylhexamethylenediamine with adipic acid were copolymerized to give polyamide chips having a CL/6-A/TMD-B molar ratio of 57/14/29, a relative viscosity of 1.83 and a melting point of 84° to 95° C. The chips were frozen at −50° C. and ground into hot melt adhesive particles of 32 to 80 mesh. The adhesive was scattered on a cotton cloth to give an interlining sheet having a basis weight of about 30 grams per square meter. After another cotton cloth was placed thereon, a test sample was prepared by pressing them with an iron at 140° C. and 0.1 kg./cm.$^2$ for 10 seconds. The sample was found to have a tear strength of 2.27 kg./2.5 cm., a tear strength after washing five times of 1.19 kg./2.5 cm. and a dry-cleanability of 52 %.

COMPARATIVE EXAMPLE 5

In the same manner as in Example 4, ε-caprolactam, a nylon salt of hexamethylenediamine with azelaic acid and a nylon salt of 2,2,4-trimethylhexamethylenediamine and 2,4,4-trimethylhexamethylenediamine with suberic acid were copolymerized to give polyamide chips having a CL/6-A/TMD-B molar ratio of 75/6/19, a relative viscosity of 2.10 and a melting point of 118° to 121° C. The chips were formd into a nonwoven web having a basis weight of about 30 grams per square meter and being adhesive on both sides in the same manner as in Example 1. A test sample was prepared under the same conditions as described in Example 1 and was found to have a tear strength of 2.43 kg./2.5 cm., a tear strength after washing five times of 1.56 kg./2.5 cm. and a dry-cleanability of 68 %.

REFERENCE EXAMPLE

ε-Caprolactam (47 mol %), hexamethylenediammonium adipate (18 mol %) and dodecanolactam (35 mol %) were copolymerized to give polyamide chips, which were formed into a film of about 60 microns thickness. A test sample was prepared under the same conditions as in Example 1.

The test sample was found to have a tear strength of 2.09 kg./2.5 cm., a tear strength after washing five times of 1.47 kg./2.5 cm. and a dry-cleanability of 60 %.

The invention thus being described, it will be obvious that the same may be varied in many ways. Such variations are not to be regarded as a departure from the spirit and scope of the invention, and all such modifications as would be obvious to one skilled in the art are intended to be included herein.

What is claimed is:

1. A copolyamide useful as a hot melt adhesive, and having improved tear strength, washability and dry-cleanability properties, consisting essentially of units derived from the polycondensation of (1) ε-caprolactam, (2) (a) hexamethylenediamine and (b) an aliphatic dicarboxylic acid selected from the group consisting of azelaic acid, sebacic acid and dodecanedioic acid in a substantially equimolar ratio and (3) (a) at least one of 2,2,4-trimethylhexamethylenediamine and 2,4,4-trimethylhexamethylenediamine and (b) an aliphatic dicarboxylic acid selected from the group consisting of azelaic acid, sebacic acid and dodecanedioic acid in a substantially equimolar ratio, the proportion of the constituent unit A essentially consisting of the component (1), the constituent unit B essentially consisting of the components (2) (a) and (2) (b) and the constituent unit C essentially consisting of the components (3) (a) and (3) (b) being within the tetragon circumscribed by the lines connecting the points P (82/17/1), Q (52/47/1), U (10/46/44) and T (86/7/7) in the graph shown in FIG. 2 of the accompanying drawing, the numerals in the parentheses following P, Q, U and T indicating the molar percentages of the constituent units A, B and C, respectively.

2. The copolyamide according to claim 1, wherein (1) is selected from the group consisting of ε-caprolactam itself, a low molecular weight polymer of ε-caprolactam and ω-aminocaproic acid.

3. A hot melt adhesive comprising the copolyamide according to claim 1 as a main component.

4. The hot melt adhesive according to claim 3, prepared in the form of a powder, film, sheet, nonwoven web or fabric.

* * * * *